United States Patent Office 3,143,917
Patented Aug. 11, 1964

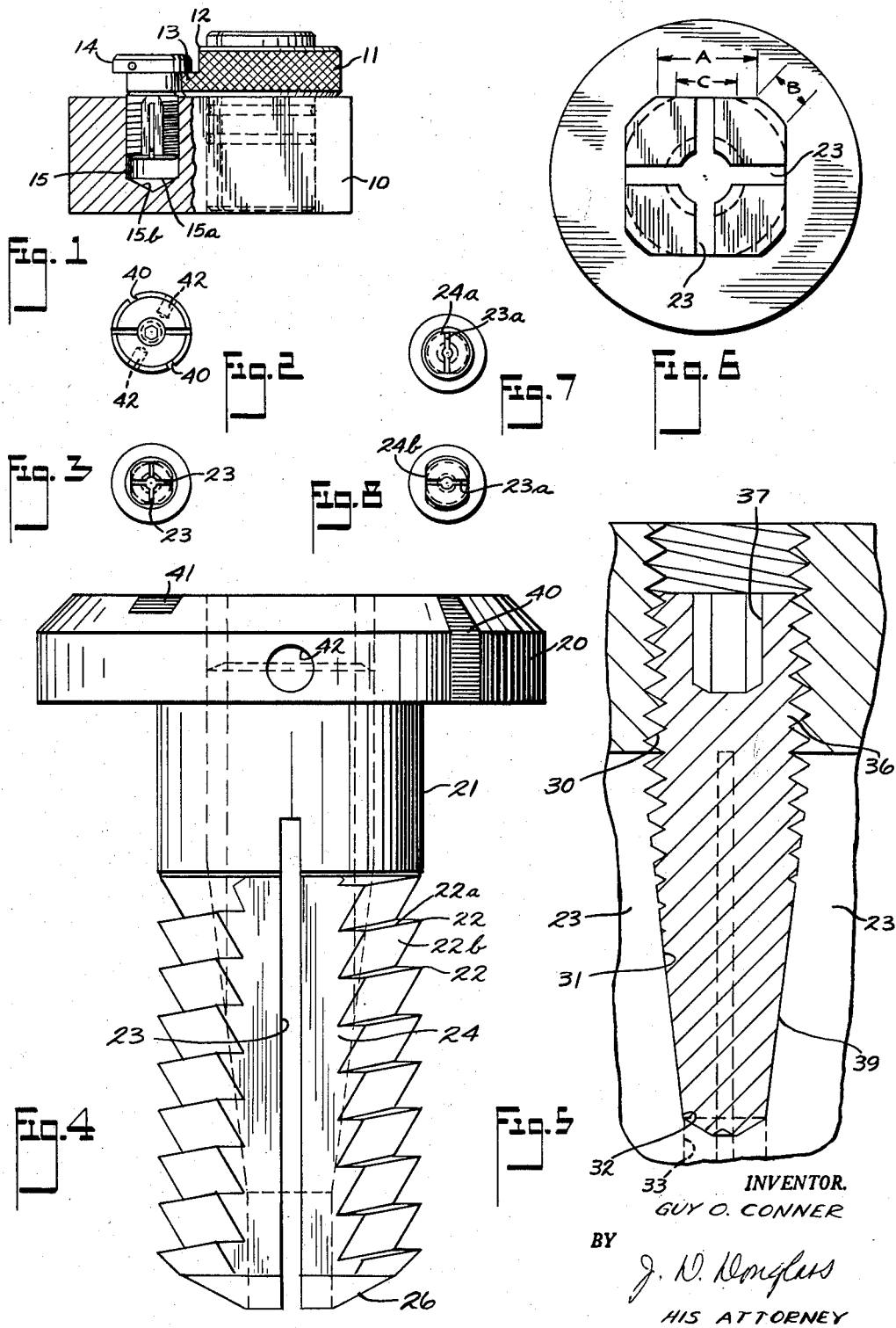

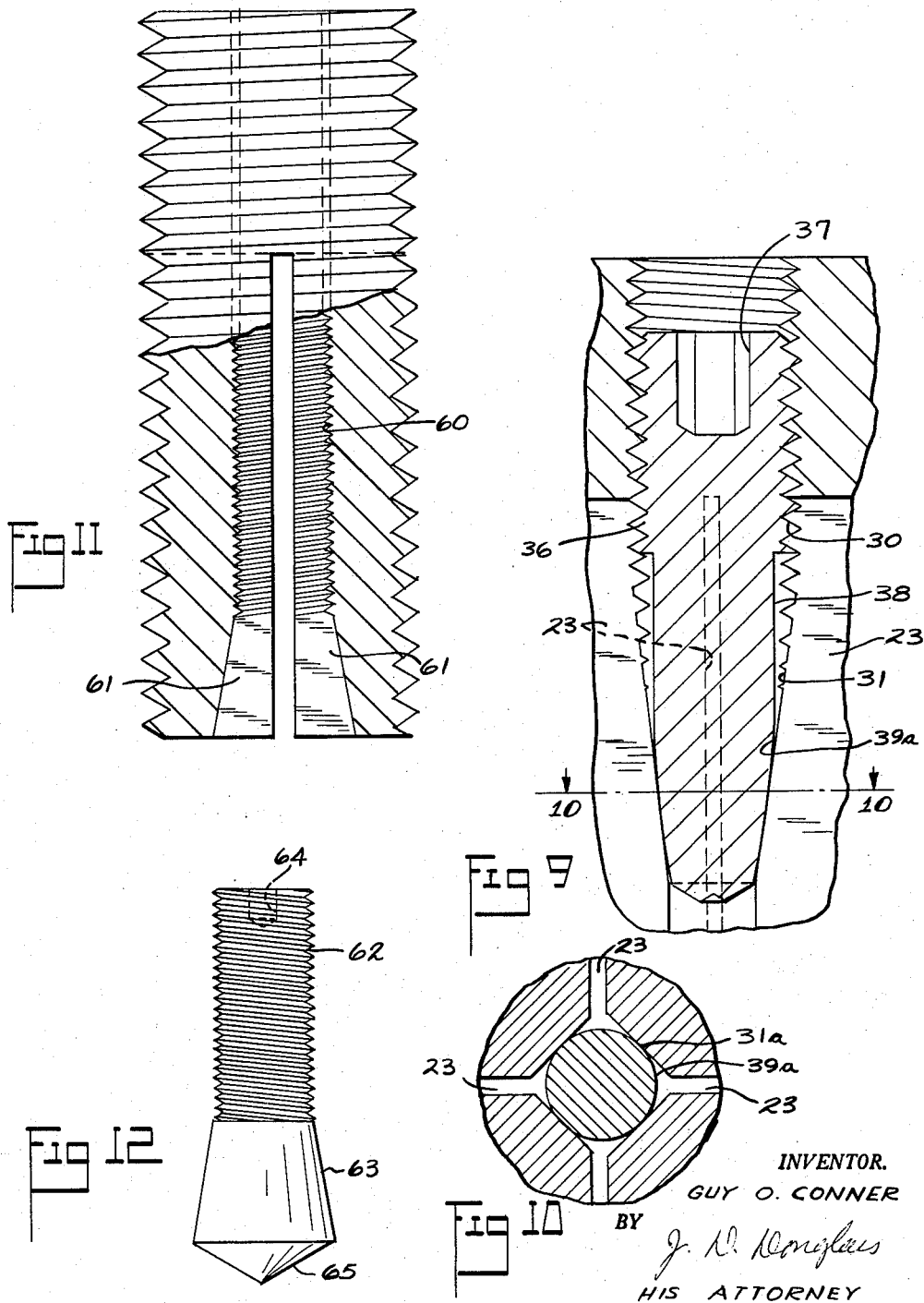

3,143,917
EXPANSIBLE STUD MEMBER FOR AN
UNTHREADED HOLE
Guy O. Conner, 1118 Mount Vernon Blvd.,
Cleveland Heights 12, Ohio
Filed Oct. 3, 1960, Ser. No. 60,142
3 Claims. (Cl. 85—83)

This invention relates to holding devices and more particularly to a type of device which may be used in lieu of a stud or, a locking screw or headed stud for holding two or more parts together. It is particularly useful in conjunction with slip renewable head drill bushings, being suitable as a replacement for or instead of, the usual lock screws. The many uses to which the invention may be applied will become more apparent as the description proceeds.

Heretofore it has been common practice, particularly in the machine tool industry, to provide blind holes, which are then threaded and a screw inserted in the hole for holding a part in place or for providing a projecting stud to support or engage with another part. The screws may be of the shoulder type, such as are used in conjunction with a slip renewable drill bushing, or of the straight type where two parts are to be held together.

It will be appreciated that the cost of making a blind threaded hole is relatively expensive as compared to parts which have a hole extending completely through the metal. The hole must first be drilled to the proper size for receiving a starting tap. It is then tapped with the starting tap and finally with a square or finished tap. Usually three taps are required to make a proper blind threaded hole. Between each of the operations the hole must be cleaned out, burrs must be removed from the edge and finally the screw or a thread gauge must be inserted and removed to determine if the hole is properly threaded.

Conservatively the cost of threading such a hole, at the current rate of labor cost, is between $1.00 and $2.00, if the job runs smoothly and no tap is broken. This is not only labor but is a utilization of time, which could be put to some other useful purpose. In addition, although the hole may be drilled in the exact spot desired it is sometimes difficult to thread the hole and have the threads exactly concentric to the original hole, with the result that the finished threaded hole may be slightly off center. It is therefore highly desirable to provide a device which will replace the usual lock screws, studs or similar devices and wherein the only requirement is that the hole be drilled to the proper depth for receiving the fastener, thus conserving the time of the workman and eliminating the need for certain perishable tools such as taps.

Furthermore when we consider the devices as a replacement for a lock screw, the lock screws themselves left much to be desired because in their manufacture it was necessary to undercut the shank adjacent the shoulder, which left a zone of weakened section at a place where the greatest strength was desirable. This undercutting was necessary, due to their being manufactured on automatic machines and in order to eliminate the usual fillet which would engage with the edge of the hole. In addition, if the part to be held was to be a movable part, the shoulder had to be the proper length to enable the part to move, without binding. If a close fit was desired, frequently the variation in normal thickness of the parts would cause a binding when the metal was thicker or caused a sloppy fit when it was thinner.

By the present invention I have provided an improved device which eliminates all of the foregoing problems. The hole in the part in which the fastener is inserted can be a plain drilled hole, such as a blind hole, and be exactly positioned in the desired location. The time and expense of tapping the hole is eliminated.

It will be apparent that for instance, in the replacement of an ordinary locking screw such as used in conjunction with drill bushings, that the cost of labor to thread the jig for reception of the screw is many times the cost of the screw.

Still other advantages of the invention, as well as the invention itself, will be apparent from the following description of some of the more apparent embodiments of the invention, which are illustrated by the accompanying drawings, and form a part of the specification.

In the drawings:

FIG. 1 is an elevational view of a portion of a drill jig and its accompanying drill bushing with a part broken away and shown in section and with a fastener made according to my invention;

FIG. 2 is a top plan view of the fastener illustrated in FIG. 1;

FIG. 3 is a bottom plan view thereof;

FIG. 4 is an enlarged side elevational view of a fastener made according to the invention;

FIG. 5 is a fragmentary vertical medial section of the fastener of FIG. 4;

FIG. 6 is a bottom plan view thereof;

FIGS. 7 and 8 are bottom plan views of modifications thereof;

FIG. 9 is a fragmentary section, similar to FIG. 5, of a modification;

FIG. 10 is a sectional view of a modification taken from a point indicated by the line 10—10 of FIG. 9;

FIG. 11 is a view partly in elevation and partly in section of another modification of the invention; and FIG. 12 is an elevational view of an expander element to be used with the device of FIG. 11.

Referring now to the drawings, throughout which like parts have been designated by like reference characters, in FIG. 1 I have illustrated a portion of a drill jig 10 in which a slip renewable drill bushing 11 is secured by a fastener constructed according to my invention. As previously stated, the invention is capable of application in many ways other than a fastener of the character to be described and a fastener is described merely as an expedient to more clearly bring out the various attributes of the invention and the invention is not limited to use with fasteners alone. In this instance, the fastener is used to replace the usual locking screw. As is well known to those versed in the art, the drill bushing head is provided with a notch 12 which provides a clearance for the head of the fastener and a flange 13, which extends under the head 14 of the fastener. As previously stated, the conventional lock screw comprises a threaded shank part which is threaded into a blind threaded hole in the jig, an enlarged part which provides a shoulder that engages with the top of the jig around the hole and which enlarged part is disposed in the notch on the drill bushing the head on the end of screw engages with the part of the bushing which projects under the head of the screw.

In this particular instance, the blind hole 15 in the drill jig is unthreaded, and the particular structure of the present invention lends itself to engagement in such a hole, which thus results in a considerable saving due to the fact that the hole need not be threaded. It will be apparent that the fastener of my invention can be used to replace the threaded lock screws ordinarily used, even though the hole is threaded.

As best seen in FIG. 4, one embodiment of my invention contemplates a head 20 which surmounts a stem or shank 21. The upper end of the shank is smooth and unthreaded. The lower two-thirds of the shank, to the end, is provided with a series of circumferentially extending projections 22. The shank is also divided by longitudinally extending kerfs 23 which extend completely through the shank from the bottom end up into the upper smooth portion. It is preferred that two such kerfs be used to divide the shank into four segments, as is best shown in FIG. 6. It will be appreciated, however, that a single kerf may be used to divide the shank into two sections or that the shank could be divided into three or more parts. Adjacent the kerfs, the shank is removed on a chord which intersects the kerf and the plane of which is normal to a centerline extending through the kerf and intersecting the axis to thus provide flat surfaces 24 on each side of the kerf.

The end of the shank is provided with surfaces 26 which slant at an angle to the axis, the purpose of which will later be made clear.

The fastener is also provided with an axial bore, which extends from the top downward and through the lower end, the purpose of which is to receive an expander member. To this end, the top end of the bore, for the full length of the unthreaded shank, is provided with conventional internal threads 30. The lower extremity 31 of the bore tapers inwardly to a point 32 spaced slightly from the bottom end, after which the remainder of the bore may be cylindrical. The tapered lower portion is unthreaded and preferably has an angle to the axis of about 3 degrees to provide a sticking taper. In forming the bore, it may first be drilled to provide a bore substantially that of the smaller end part 33. The hole may then be tapped with a tap, which may be a compromise between a starting tap and the second tap usually used in tapping blind holes. It will be appreciated that the upper portion of the bore may be counterbored, instead of threaded, where threads are not needed to the full extent indicated in the drawings, which would save threading time.

The expander screw, best shown in FIG. 5, may comprise an upper threaded part 36, having a wrench-receiving socket 37. Below the threaded part, there may be a straight shank part, not shown in FIG. 5 but shown in FIG. 9, the end of which terminates in a tapered portion 39. Preferably the tapered end part is also tapered at about 3 degrees for cooperation with the tapered wall, the taper being also a sticking taper.

The head 20 may be formed with means for rotating the fastener. As best shown in FIGS. 2 and 4, notches 40 in the periphery enable the application of a spanner wrench. A slot 41 across the head enables the application of a screw driver or the like. Radial holes 42 permit the application of a rod-like member.

Although the fastener may be formed to the configuration described, certain operations can more expediently be done prior to others. For instance, it is preferable that the head and shank, as well as the center bore, be preformed prior to the forming of the projections and that the making of the kerfs be deferred to the last operation. The flats 24 can be formed after the forming of the projections.

Of particular importance is the design of the projections, which will be better understood after a brief description of the mode of operation. They can have a pitch, as shown in the drawings, or, be without pitch.

As previously stated, it is preferred, particularly on original equipment, that the hole in which the fastener is inserted, be a plain drilled hole, as shown in FIG. 1. This enables the hole to be most accurately placed, eliminates the need for tapping a blind hole, and assures that the hole center will not be moved to one side or the other, which might occur during tapping.

The hole 15 having been formed in the drill jig, or any other part with which the device is to be used, the fastener is inserted to the desired depth and the expander tightened. The tapered end of the expander engages with the tapered wall 31 of the bore and the segments of the shank are forced outward against the wall of the hole 15.

At this point it should be pointed out that an expedient way to form the projections is to cut them into the shank prior to the formation of the kerfs 23 or flats 24. Thus, the projections may be made by a turning or threading operation.

It should be particularly noted that the formation of the projections illustrated in FIG. 4 is that of a buttress thread wherein a shoulder 22a is provided facing toward the head of the fastener and the crest of the abutments are backed up by a slanting wall 22b. By this formation a pulling effect on the fastener causes the crest of the abutments or projections to dig into the wall of the hole 15. The slanting wall backing up the shoulder performs two functions. In the first place it provides strength for the crest and shoulder, preventing it from breaking off. Second, as the crest of the teeth or projections bite into the wall, the material of the wall is caused to curl outward where it immediately hits the slanting wall 22b, which causes it to then curl back upon itself and form a compact ridge of material of the wall which prevents the material from being separated as a chip. This, of course, is presuming one mode of installation where the fastener is merely inserted in a hole and the expander tightened. Again it should be pointed out that projections of other shapes may also be used and in some instances the projections may be in the form of normal standard or S.A.E. threads which should, however, preferably have sharp crests. It is also contemplated that points of diamond shape or knurls may be used and these could be formed by forging or rolling. It is possible that in some applications sufficient holding power is obtained by merely sand-blasting or etching the surface.

Another mode of operation is contemplated, however, particularly where the projections are formed initially as a thread. At this point it should be mentioned that the projections could be straight circumferentially extending projections without pitch, and, that in use they would perform in the manner stated. The other mode of operation contemplates that the fastener be inserted and expanded and that then it be turned by a spanner wrench or by inserting a tool in the holes 42. Various degrees of turning may be effected to afford different results.

The first contemplates that the fastener be turned 90 degrees or less. At this time the projections which have bit into the wall cause the wall, into which the projections are turned, to be forged to provide complementary projections on the wall to those on the fastener. That is, the flats 24 at the leading and trailing edges of the projections provide an entering tooth edge, which can be best seen in FIG. 6, that provides an obtuse entering portion for each projection which engages with the wall and moves the wall parts to a new position by a forging operation. No chips are formed, during the process; the material of the wall is merely displaced from one position to another.

It will thus be seen that if the turning of the fastener is accompanied by a tightening of the expander, matching and spaced projections are formed on the wall corresponding to those of the fastener. If the turning is confined to 90 degrees or less, subsequently the fastener may be removed by merely loosening the expander and turning the fastener so that the teeth of the fastener disengage from those forged in the hole and it may then be lifted out of the hole.

In order to assure that the quick removable feature may be realized, it is desirable that the material removed to provide the flats 24 be along a chord A which is slightly below the roots of the projections C so that the projections B formed on the wall are shorter than the flats. Thus when the fastener is rotated the projections on the fastener may be rotated free of the projections on the wall of the hole.

It is apparent, however, that the features other than the quick removable feature, may be realized with a design of flats 24 considerably less than that shown in FIG. 6. In this case, the projections on the fastener would extend for a greater distance and it would only be desirable to remove the material to the root of the projection, and the projections would be forged in the wall of the hole by turning action of the fastener.

When the projections are made with a predetermined pitch, another advantage is realized in that when the fastener is expanded and turned, it forges threads in the wall which cooperate with the fastener and upon further turning of the fastener it screws itself into the hole and can be used to securely hold two parts against movement relative to each other.

A marked advantage of the fastener is realized because no shoulder, such as is used on lock screws, is needed and because the fastener can be inserted in the hole 15 any desired distance, expanded, and will remain in the desired position. As previously mentioned, this eliminates the need for the usual undercut, adjacent the shoulder, and makes the fastener stronger than the conventional lock screw, which has to be undercut to remove the fillet which would otherwise engage the top of the hole 15 and prevent the shoulder from coming to rest on top of the jig.

FIG. 7 illustrates a fastener with a single diametric kerf 23a which divides the shank into two parts. In this instance, the flats are merely removed to the root of the projections.

FIG. 8 is similar except that the flats 24b are extended below the roots of the projections.

In FIG. 9 I have also shown a modification of the expander wherein instead of the straight tapered wall 39 the end is provided with a curved part of spherical configuration 39a. The engagement of the expander with the wall, in this instance, will be a tangential engagement.

FIG. 10 illustrates another modification being a section taken at the line 10—10 of FIG. 9. In this instance, the outer tapered wall 31 instead of being circular, as in FIG. 9, is provided with tapered flats 31a. The expander may be as in either one of the structures illustrated in FIG. 5 or 9, and the walls 31a have a tangential engagement with the expander. Obviously the formation of the flat walls 31a would be by some other means than a tap and preferably would be formed by forging.

It was previously stated that the end of the fastener could be provided with a slanting end such as shown at 26 in FIG. 4. This provides another advantage when the device is to be removed. It will be recalled that the expander causes the separate segments to be moved outward. This may cause the segments to take an outward set which makes it difficult to remove. Since normally the end of the fastener would be close to the bottom of the hole 15, as a matter of fact at about the position where the beveled end of the drill stopped, 15a of FIG. 1, the expander may be loosened and the fastener either turned down until the slanting end 26 engages with the slanting end wall 15b or driven down with a hammer, causing the camming action of the walls 26 with the wall 15b to force the segments inward, reducing the size of the fastener without impairing its furture usefulness.

In FIG. 11, I have illustrated another embodiment of my invention, wherein the central threaded bore 60 of a stud is provided with a left hand internal thread. At the extremity the bore is formed to provide flat walls 61 that diverge outwardly toward the bottom. The expander element, FIG. 12, comprises a lefthanded threaded shank 62, for engagement with the threads 60 and an end frusto conical part 63. In this device the expander is inserted from the bottom end, and when the screw is rotated by a wrench in the socket 64 in a clockwise direction, as viewed from the top, the shank 62 is moved upward and the expander portion 63, which has tangential engagement with the walls 61, cause the expansion of the segments outward.

This device has the advantage that expansion is assured by an even pressure, for a considerable linear distance, at the extreme lower end. In addition, when it is desired to remove the fastener, if the expander is turned counterclockwise, the point 65 will eventually bottom in the hole 15 and force the fastener upward.

Having thus described the invention in some embodiments thereof, it will be appreciated that numerous and extensive departures may be made therefrom without departing from the spirit of the invention as defined in the appended claims.

I claim:
1. A fastening device to be received within a smooth cylindrical opening comprising, a generally cylindrical body having a holding portion at one end and a head portion at the other end, said body having a longitudinally extending central bore, said bore having an inwardly tapered portion at said one end and being threaded at the other end, said holding portion being provided with at least two radial slots extending radially outwardly from the bore and longitudinally from said one end of the body to provide a plurality of circumferentially spaced segments having semicylindrical gripping surfaces, said gripping surfaces being provided with a plurality of outwardly projecting arcuate ridges for deforming engagement with the interior surface of said opening, that portion of the surface of said segments adjacent each of said slots being defined generally by a plane normal to the radius disposed in the plane of each slot of the fastener body and passing below the roots of the arcuate ridges such that the ridges are circumferentially shorter than the flats formed by the planes, the ends of said arcuate ridges being also defined by said plane, and longitudinally movable expander means contained within said bore, said expander means having a tapered portion co-acting with said tapered portion of the bore and a threaded portion co-acting with the threads in the bore for moving said segments radially outward.

2. The invention as defined in claim 1, wherein said expander means includes an arcuately tapered head, and said segments are provided with converging inner surfaces for operative engagement with the expander head.

3. The invention as defined in claim 2, wherein said inner surfaces are flat for tangential contact with the arcuate surfaces of the expander head.

References Cited in the file of this patent

UNITED STATES PATENTS

| 932,398 | Kenney | Aug. 24, 1909 |
| 972,924 | Robinson | Oct. 18, 1910 |
| 990,065 | Sargeant | Apr. 18, 1911 |
| 1,168,160 | Cashman | Jan. 11, 1916 |
| 1,948,889 | Simon | Feb. 27, 1934 |
| 1,987,474 | Grant | Jan. 8, 1935 |
| 2,463,859 | Engstrom | Mar. 8, 1949 |
| 2,479,075 | Martin | Aug. 16, 1949 |
| 3,042,094 | Liljeberg | July 3, 1962 |

FOREIGN PATENTS

| 476,351 | Great Britain | Dec. 7, 1937 |
| 138,747 | Sweden | Jan. 13, 1953 |